(12) United States Patent
Motoya et al.

(10) Patent No.: US 12,153,295 B2
(45) Date of Patent: Nov. 26, 2024

(54) OPTICAL WAVEGUIDE ELEMENT, AND OPTICAL MODULATION DEVICE AND OPTICAL TRANSMISSION DEVICE USING THE SAME

(71) Applicant: SUMITOMO OSAKA CEMENT CO., LTD., Tokyo (JP)

(72) Inventors: Masayuki Motoya, Tokyo (JP); Toshio Kataoka, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 199 days.

(21) Appl. No.: 17/954,304

(22) Filed: Sep. 27, 2022

(65) Prior Publication Data

US 2023/0096004 A1 Mar. 30, 2023

(30) Foreign Application Priority Data

Sep. 30, 2021 (JP) .................. 2021-162200

(51) Int. Cl.
*G02F 1/035* (2006.01)
*G02F 1/025* (2006.01)

(52) U.S. Cl.
CPC .............. *G02F 1/035* (2013.01); *G02F 1/025* (2013.01); *G02F 2201/121* (2013.01)

(58) Field of Classification Search
CPC .......... G02F 1/225; G02F 1/035; G02F 1/212; G02F 1/0356; G02F 1/0305; G02F 1/0316; G02F 1/0344; G02F 2202/20; G02F 2201/12; G02F 2203/21
See application file for complete search history.

(56) References Cited

U.S. PATENT DOCUMENTS

| 5,138,480 A | * | 8/1992 | Dolfi | G02F 1/2255 359/251 |
| 5,416,859 A | * | 5/1995 | Burns | G03F 7/40 385/3 |
| 5,502,780 A | * | 3/1996 | Rangaraj | G02F 1/2255 385/9 |
| 6,674,565 B2 | * | 1/2004 | Kondo | G02F 1/2255 385/39 |

(Continued)

FOREIGN PATENT DOCUMENTS

| EP | 1132764 | 9/2001 |
| JP | H05196902 | 8/1993 |

(Continued)

*Primary Examiner* — Ryan A Lepisto
*Assistant Examiner* — Erin D Chiem
(74) *Attorney, Agent, or Firm* — JCIPRNET

(57) ABSTRACT

An optical waveguide element includes a substrate having an electro-optic effect, an optical waveguide formed in the substrate, and a control electrode arranged on the substrate to modulate a light wave propagating through the optical waveguide. The control electrode includes a signal electrode and a ground electrode. The signal electrode and the ground electrode are arranged along a modulation effect portion of the optical waveguide that performs modulation. In a shape of a bottom surface of the ground electrode facing the substrate, a slit separating the ground electrode into a first ground electrode close to the signal electrode and a second ground electrode far from the signal electrode is formed in a range corresponding to the modulation effect portion.

9 Claims, 8 Drawing Sheets

(56) References Cited

U.S. PATENT DOCUMENTS

| | | | |
|---|---|---|---|
| 7,171,063 B2 * | 1/2007 | Feke | G02F 1/035 |
| | | | 385/39 |
| 10,578,893 B2 | 3/2020 | Hosokawa et al. | |
| 2004/0151414 A1 | 8/2004 | Cheung et al. | |
| 2010/0247024 A1 * | 9/2010 | Kinpara | G02F 1/0356 |
| | | | 385/2 |
| 2018/0017839 A1 | 1/2018 | Hosokawa et al. | |
| 2018/0173026 A1 * | 6/2018 | Kissa | G02F 1/2255 |
| 2022/0146901 A1 | 5/2022 | Miyazaki et al. | |

FOREIGN PATENT DOCUMENTS

| | | |
|---|---|---|
| JP | 2019174588 | 10/2019 |
| WO | 2020202596 | 10/2020 |

* cited by examiner

OPTICAL WAVEGUIDE ELEMENT, AND OPTICAL MODULATION DEVICE AND OPTICAL TRANSMISSION DEVICE USING THE SAME

CROSS-REFERENCE TO RELATED APPLICATION

This application claims the priority benefit of Japan application serial no. 2021-162200, filed on Sep. 30, 2021. The entirety of the above-mentioned patent application is hereby incorporated by reference herein and made a part of this specification.

BACKGROUND

Technical Field

The disclosure relates to an optical waveguide element, and an optical modulation device and an optical transmission device using the same, and more particularly, to an optical waveguide element which suppresses a dip phenomenon of high frequency characteristics.

Related Art

Optical waveguide elements, e.g., optical modulators, using substrates formed with optical waveguides are widely used in the fields of optical measurement technology and optical communication technology. In recent years, there has been a demand for the use of optical modulators in higher frequency bands (e.g., 30 to 300 GHz) to respond to the increasing traffic volume of mobile communications.

FIG. 1 is a cross-sectional view showing an example of a conventional optical waveguide element. In FIG. 1, an optical waveguide 2 is formed by thermally diffusing Ti or the like on a substrate 1 having an electro-optic effect, such as lithium niobate (LN). A control electrode for applying an electric field to the optical waveguide is formed on the substrate 1, and specifically, a signal electrode S and a ground electrode G sandwiching the signal electrode S are formed.

The lower portion of the ground electrode has a shape protruding toward the signal electrode side. This is because the electric field applied to the optical waveguide is enhanced by narrowing the distance between the signal electrode and the ground electrode in the vicinity of the optical waveguide. Another reason is that, by widening the distance between the signal electrode and the ground electrode at the upper portion of the electrode, speed matching is realized between a light wave propagating through the optical waveguide and a microwave propagating through the signal electrode, and impedance of the control electrode is increased, for example, to close to 50Ω of an input impedance.

Further, in FIG. 1, by reducing the thickness of the substrate 1, the efficiency of the electric field applied to the optical waveguide is improved. A holding substrate 4 is bonded via an adhesive layer 3 to reinforce the mechanical strength of the thin substrate 1.

FIG. 2 shows frequency characteristics of the optical waveguide element as shown in FIG. 1. The horizontal axis of FIG. 2 represents a frequency of the microwave applied to the optical waveguide element, and the vertical axis represents loss (insertion loss) of transmission characteristics (S21) of the optical waveguide element. Referring to the frequency characteristics of FIG. 2, a so-called dip phenomenon occurs, in which the waveform is greatly depressed (dropped) in high frequency bands.

The reason lies in that, as shown in FIG. 1, the electric field (electric field lines EF) formed by the control electrode spreads not only in the substrate 1 but over the entirety including the holding substrate 4, and the high-frequency microwave applied to the signal electrode is coupled with a resonance mode (substrate mode) in the substrate.

To suppress such a dip (ripple) phenomenon, Patent Document 1 (Japanese Patent Application Laid-Open No. 2019-174588) has disclosed that a low dielectric constant portion is locally formed in a holding substrate (reinforcing substrate). The method disclosed in Patent Document 1 has problems of complicating the manufacturing process of the holding substrate 4 and increasing the manufacturing cost.

SUMMARY

According to embodiments of the disclosure, an optical waveguide element, and an optical modulation device and an optical transmission device using the same according to the disclosure include the following technical features.

(1) An optical waveguide element includes a substrate having an electro-optic effect, an optical waveguide formed in the substrate, and a control electrode arranged on the substrate to modulate a light wave propagating through the optical waveguide. The control electrode includes a signal electrode and a ground electrode. The signal electrode and the ground electrode are arranged along a modulation effect portion of the optical waveguide that performs modulation. In a shape of a bottom surface of the ground electrode facing the substrate, a slit separating the ground electrode into a first ground electrode close to the signal electrode and a second ground electrode far from the signal electrode is formed in a range corresponding to the modulation effect portion.

(2) In the optical waveguide element according to (1) above, a width of the slit in a direction perpendicular to an extending direction of the modulation effect portion is 40 μm or more.

(3) In the optical waveguide element according to (1) or (2) above, a width of a bottom surface portion of the first ground electrode in a direction perpendicular to an extending direction of the modulation effect portion is 100 μm or less.

(4) In the optical waveguide element according to any one of (1) to (3) above, a ratio (WSL/WG1) of a width (WSL) of the slit in a direction perpendicular to an extending direction of the modulation effect portion to a width (WG1) of a bottom surface portion of the first ground electrode in the direction perpendicular to the extending direction of the modulation effect portion is 0.4 or more.

(5) In the optical waveguide element according to any one of (1) to (4) above, a shape of the first ground electrode has an L-shaped multi-step structure in which a lower portion is closer to the signal electrode than an upper portion. A width of the lower portion protruding toward a signal electrode side more than the upper portion in a direction perpendicular to an extending direction of the modulation effect portion is set to a range of 20 to 70% of a width of the signal electrode.

(6) In the optical waveguide element according to any one of (1) to (5) above, a shape of the first ground electrode has an L-shaped multi-step structure in which a lower portion is closer to the signal electrode than an upper portion. A height of the lower portion is 2 to 10 μm. A total height of the lower portion and the upper portion is 20 to 50 μm.

(7) In the optical waveguide element according to any one of (1) to (6) above, the first ground electrode and the second ground electrode are electrically connected to each other outside the range corresponding to the modulation effect portion of the optical waveguide.

(8) In the optical waveguide element according to any one of (1) to (7) above, the substrate has a thickness of 20 μm or less. A holding substrate is arranged on a back side of the substrate via an adhesive layer.

(9) In an optical modulation device, the optical waveguide element according to any one of (1) to (8) above is accommodated in a housing, and the optical modulation device includes an optical fiber which inputs or outputs a light wave from or to the optical waveguide.

(10) The optical modulation device according to (9) above includes an electronic circuit inside the housing to amplify a modulation signal inputted to the signal electrode of the optical waveguide element.

(11) An optical transmission device includes the optical modulation device according to (9) or (10) above, and an electronic circuit which outputs a modulation signal causing the optical modulation device to perform a modulation operation.

The disclosure provides an optical waveguide element including a substrate having an electro-optic effect, an optical waveguide formed in the substrate, and a control electrode arranged on the substrate to modulate a light wave propagating through the optical waveguide. The control electrode includes a signal electrode and a ground electrode. The signal electrode and the ground electrode are arranged along a modulation effect portion of the optical waveguide that performs modulation. In a shape of a bottom surface of the ground electrode facing the substrate, a slit separating the ground electrode into a first ground electrode close to the signal electrode and a second ground electrode far from the signal electrode is formed in a range corresponding to the modulation effect portion. Therefore, coupling with the substrate mode is suppressed, and the dip phenomenon of the frequency characteristics is suppressed. Moreover, since only the shape of the control electrode is changed, an increase in manufacturing cost can also be suppressed.

BRIEF DESCRIPTION OF THE DRAWINGS

FIG. 8A shows suitable frequency characteristics and an approximate curve (fitting curve) thereof. FIG. 8B shows the approximate curve of FIG. 8A and frequency characteristic to be evaluated.

DESCRIPTION OF THE EMBODIMENTS

Embodiments of the disclosure provide an optical waveguide element which suppresses the dip phenomenon of frequency characteristics and suppresses an increase in manufacturing cost. Further, the disclosure provides an optical modulation device and an optical transmission device using the optical waveguide element.

Hereinafter, an optical waveguide element of the disclosure will be described in detail with reference to exemplary examples.

Figure 3:
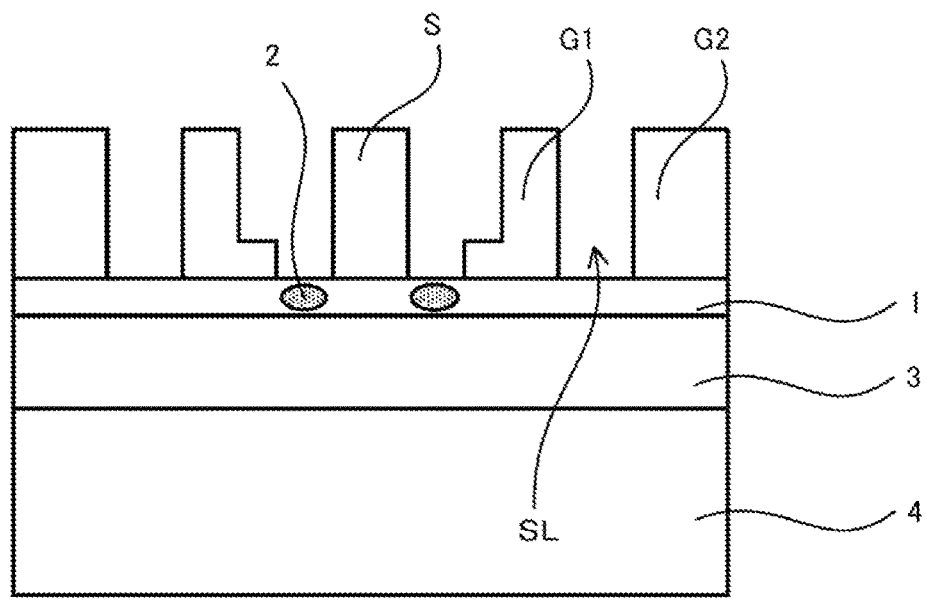
FIG. 3 is a cross-sectional view illustrating an embodiment related to an optical waveguide element of the disclosure.

As shown in FIG. 3, the optical waveguide element of the disclosure includes a substrate 1 having an electro-optic effect, an optical waveguide 2 formed in the substrate, and a control electrode arranged on the substrate 1 to modulate a light wave propagating through the optical waveguide. The optical waveguide element is characterized in that the control electrode includes a signal electrode S and a ground electrode, and the signal electrode S and the ground electrode are arranged along a modulation effect portion of the optical waveguide that performs modulation. In the shape of a bottom surface of the ground electrode facing the substrate, a slit SL separating the ground electrode into a first ground electrode G1 close to the signal electrode S and a second ground electrode G2 far from the signal electrode S is formed in a range corresponding to the modulation effect portion.

The material of the substrate 1 used in the optical waveguide element of the disclosure may include a ferroelectric material having an electro-optic effect, specifically, a substrate of lithium niobate (LN), lithium tantalate (LT), PLZT (lead lanthanum zirconate titanate), or a vapor-phase growth film made of these materials. Various materials such as semiconductor materials and organic materials may also be used as the substrate of the optical waveguide element.

According to an embodiment, to improve the electric field efficiency applied to the optical waveguide, the thickness of the substrate 1 in which the optical waveguide is formed may be set to 20 μm or less, preferably 10 μm or less, and more preferably 5 μm or less or 2 μm or less, for example. In such cases, to reinforce the mechanical strength of the substrate 1, for example, a holding substrate 4 having a thickness of 0.2 to 1 mm is attached via an adhesive layer (adhesive) having a thickness of about 20 to 80 μm, or the holding substrate and the substrate are directly bonded together. LN or the like may be used as the holding substrate.

The method of forming the optical waveguide in the substrate 1 may include the following methods: a high refractive index type optical waveguide is formed by a method of thermally diffusing a high refractive index material such as Ti on a substrate or by a proton exchange method, or a rib-type optical waveguide in which a portion of the substrate corresponding to the optical waveguide is configured in a protruding shape is formed by etching the substrate or forming grooves on two sides of the optical waveguide.

As shown in FIG. 3, the feature of the optical waveguide element of the disclosure lies in that the ground electrode facing the signal electrode S is separated into the first ground electrode G1 and the second ground electrode G2 by using a slit. As for the shape of the slit, as shown in FIG. 3, the slit SL may penetrate the ground electrode.

Figure 4:
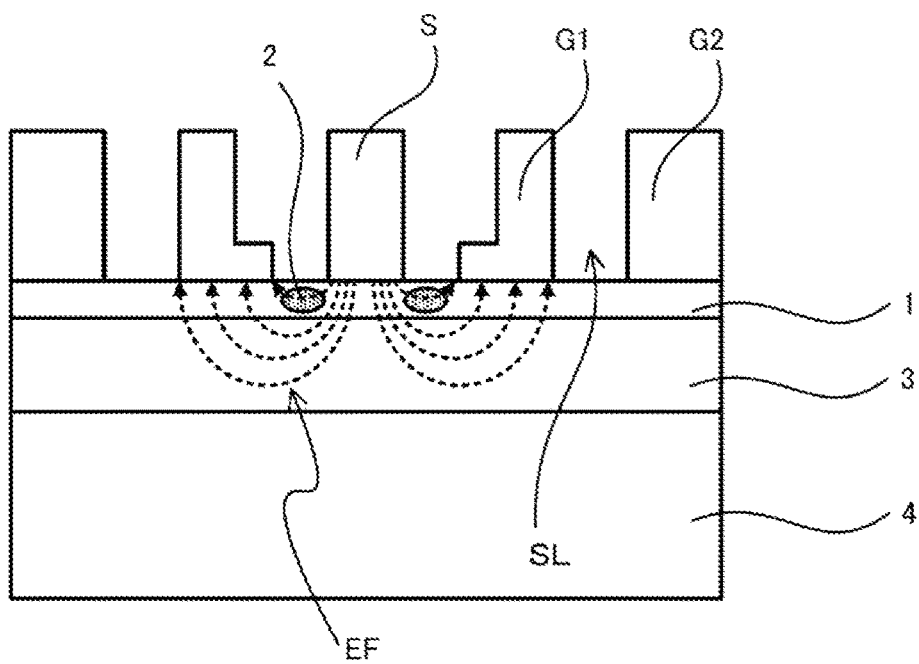
FIG. 4 is a view illustrating electric field lines (electric field distribution) related to the optical waveguide element of FIG. 3.

By separating the ground electrode into the first ground electrode and the second ground electrode as in the disclosure, as shown in FIG. 4, the electric field (electric field lines EF) formed by the signal electrode S and the ground electrode concentrates on the first ground electrode, and coupling is suppressed between the frequency of a modulation signal and a substrate mode, which is a resonance mode of the entire substrate (including the substrate 1, the adhesive layer 3, and the holding substrate 4) including the holding substrate 4.

Figure 1:
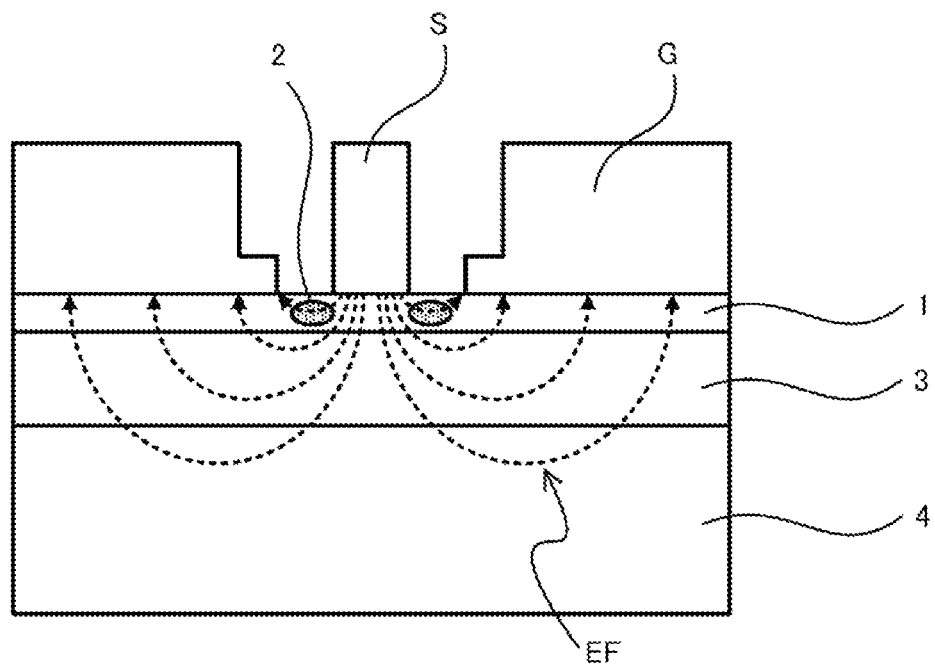
FIG. 1 is a cross-sectional view illustrating a structure of a conventional optical waveguide element.
Figure 2:
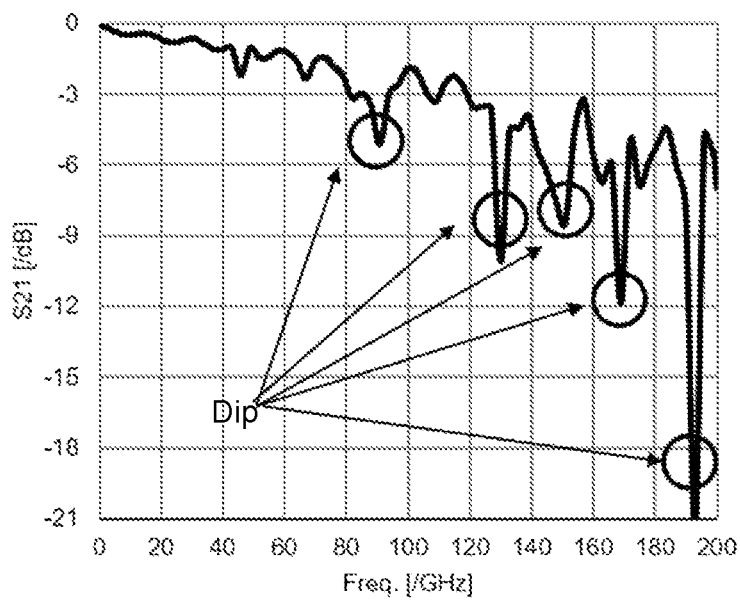
FIG. 2 is a graph showing frequency characteristics related to the optical waveguide element of FIG. 1.
Figure 5:
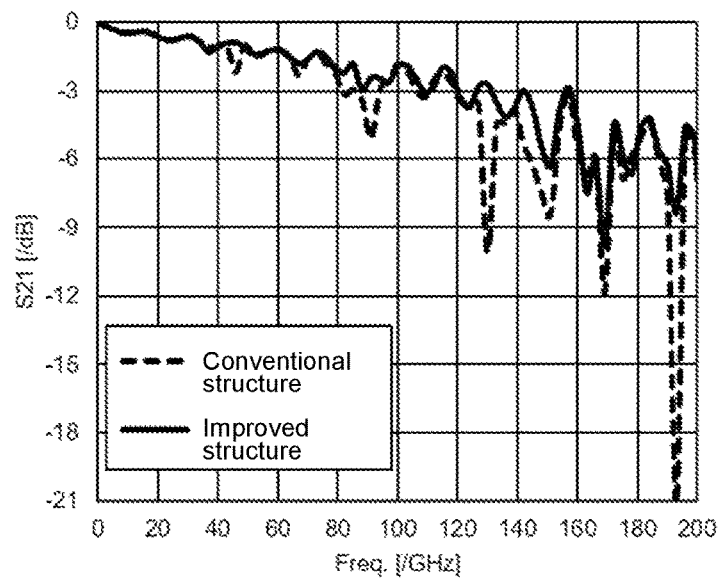
FIG. 5 is a graph showing frequency characteristics related to the optical waveguide element of the disclosure.

FIG. 5 is a graph displaying a simulation result of frequency characteristics of the disclosure in the case where a width of the first ground electrode G1 is set to 48 μm and a slit width is set to 410 μm in FIG. 3, superimposed with frequency characteristics (simulation result) of the conventional structure of FIG. 1. Referring to the graph of FIG. 5, it is easily understood that the optical waveguide element of the disclosure can suppress the dip phenomenon more effectively.

Figure 6:
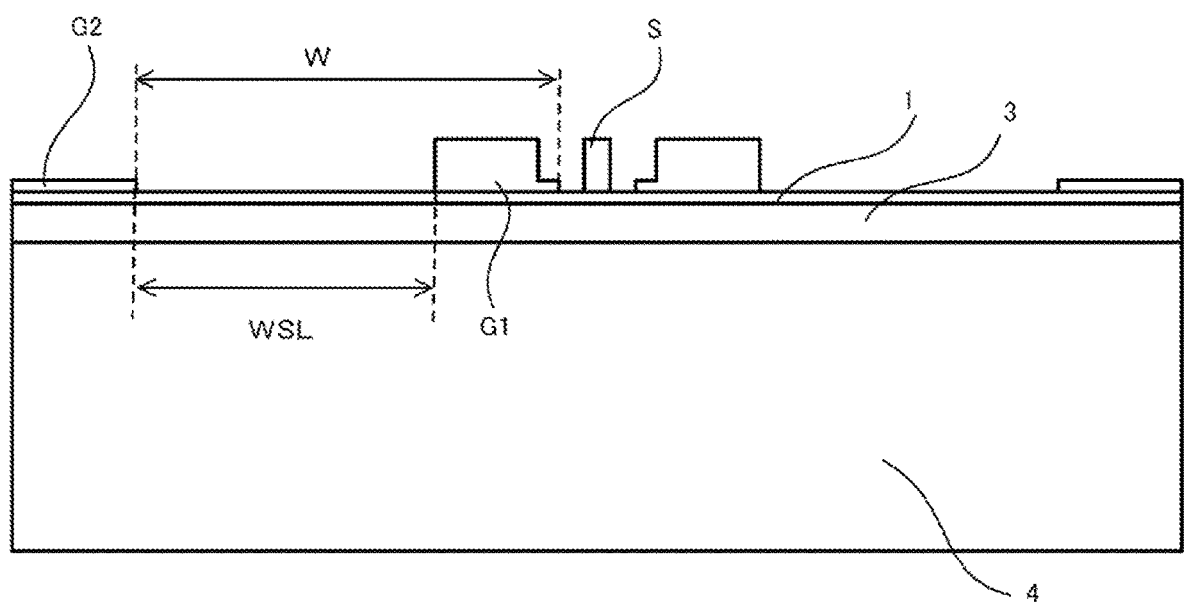
FIG. 6 is a view illustrating a simulation model related to the optical waveguide element of the disclosure.
Figure 7:
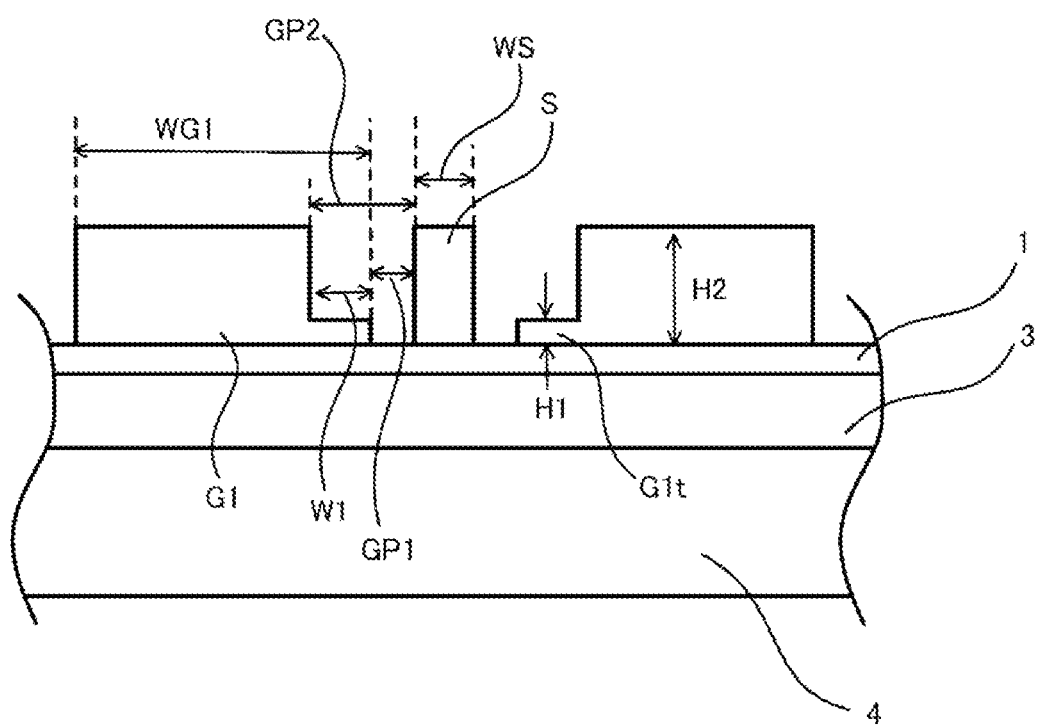
FIG. 7 is an enlarged view of the vicinity of a signal electrode S in FIG. 6.

To explore the shape of the control electrode suitable for the optical waveguide element of the disclosure, the models shown in FIG. 6 and FIG. 7 have been set and simulations have been performed.

In FIG. 6, the first ground electrode G1 has been provided to sandwich the signal electrode S, and the second ground electrode G2 has been provided on a side of the first ground electrode G1 opposite to the signal electrode S. A width of the slit SL located between the first ground electrode G1 and the second ground electrode G2 has been set as WSL. A total width (length) of the width of the first ground electrode G1 and the width of the slit SL has been set as W.

FIG. 7 is a view illustrating various parameters which define the shapes of the signal electrode S and the first ground electrode G1.

The definition of each parameter is as follows.
  WS: width of the signal electrode
  WG1: width of the first ground electrode
  W1: width of a portion (G1t) protruding toward the signal electrode side at a lower portion of the first ground electrode
  H1: height of the portion (G1t) protruding toward the signal electrode side at the lower portion of the first ground electrode
  H2: height of the first ground electrode
  GP1: distance (gap) between the signal electrode and the protruding portion (GU) of the first ground electrode
  GP2: distance (gap) between the signal electrode and an upper portion of the first ground electrode
  WSL: width of the slit
  W: WG1+WSL (Regarding Width of Slit)

The following simulation has been performed to investigate an optimum value for the width of the slit SL.

Each parameter has been set as follows, and the slit width WSL has been varied in the range of 0 to 80 μm.
  WS: 30 μm
  WG1: 48 μm
  W1: 18 μm
  H1: 4.5 μm
  H2: 40 μm
  GP1: 20 μm
  GP2: 38 μm Further, the thickness of the substrate 1 has been set to 9 μm, the thickness of the adhesive layer 3 has been set to 55 μm, and the thickness of the holding substrate 4 has been set to 500 μm.

Figure 8A:
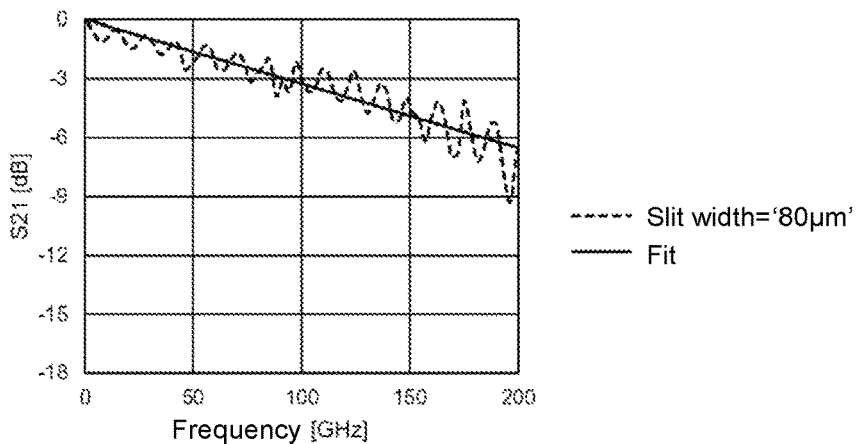
FIG. 8A and FIG. 8B are graphs illustrating a method of evaluating frequency characteristics.
Figure 8B:
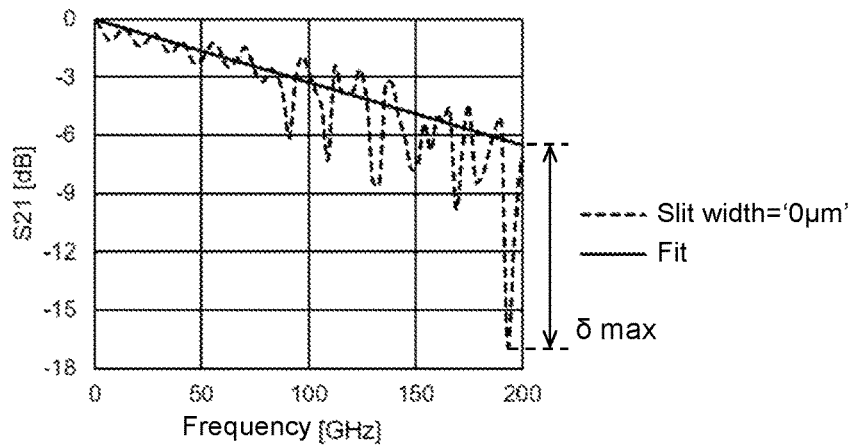

To evaluate the frequency characteristics, the size of the dip has been measured using an approximate curve (fitting curve) as shown in FIG. 8A and FIG. 8B. Specifically, FIG. 8A shows the frequency characteristics of WSL=80 μm, and an approximate curve has been set based on this graph. Next, as shown in FIG. 8B, the approximate curve obtained in FIG. 8A was fit with respect to the frequency characteristics in the case of varying the slit width WSL, and a maximum deviation amount (δmax) of the frequency characteristics was measured from the approximate curve. It is evaluated that the larger the deviation amount (δmax) is, the lower the effect of improving the frequency characteristic is.

Figure 9:
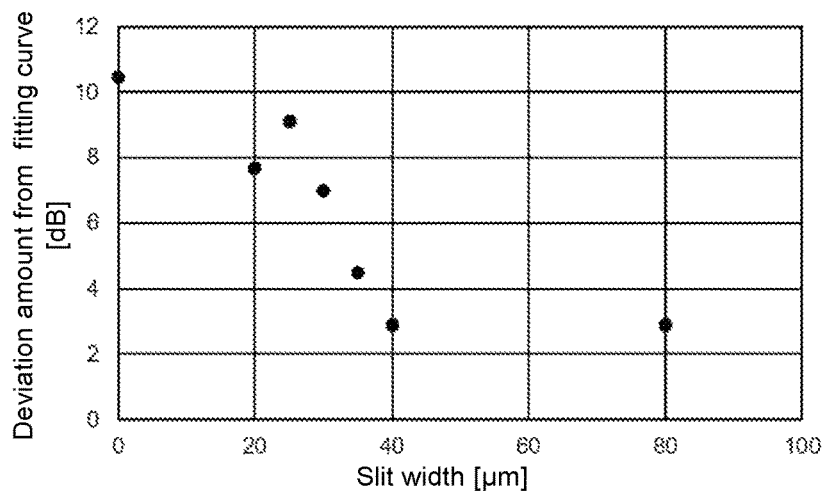
FIG. 9 is a graph illustrating a relationship between a width of a slit used in the optical waveguide element of the disclosure and a deviation amount from the approximate curve (fitting curve).

FIG. 9 is a graph showing the deviation amount with respect to the slit width WSL, and the deviation amount tends to decrease as the slit width WSL increases. Specifically, it is understood that when the slit width WSL is 20 μm or more, the decreasing tendency becomes significant, and in particular, in the case where the slit width WSL is 40 μm or more, there is almost no change in the deviation amount, and the effect is stable. It is assumed that this is because the effect of separating the first ground electrode and the second ground electrode is weakened when the slit width is narrowed.

Based on the above, it is preferable to set the slit width WSL to 20 μm or more, and more preferably, to 40 μm or more, for example.

(Regarding Width of First Ground Electrode)

Next, to investigate an optimum value for the width WG1 of the first ground electrode, a simulation has been performed under the following conditions. The width WG1 of the first ground electrode has been varied in the range of 48 (30+18) μm to 418 (400+18) μm.
  WS: 30 μm
  W1: 18 μm
  H1: 4.5 μm
  H2: 40 μm
  GP1: 20 μm
  GP2: 38 μm
  WSL: 80 μm The thickness of the substrate 1 has been set to 9 μm, the thickness of the adhesive layer 3 has been set to 55 μm, and the thickness of the holding substrate 4 has been set to 500 μm.

Further, evaluation of the obtained frequency characteristics has been performed in the same manner as the evaluation using the approximate curve (fitting curve) described above.

Figure 10:
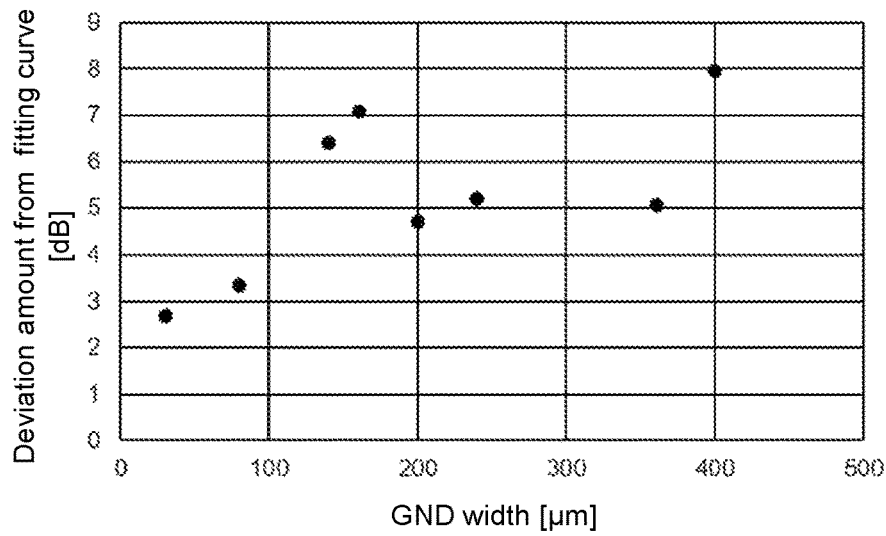
FIG. 10 is a graph illustrating a relationship between a width of a first ground electrode used in the optical waveguide element of the disclosure and a deviation amount from the approximate curve (fitting curve).

FIG. 10 is a graph showing the deviation amount with respect to the width WG1 of the first ground electrode, and as for the width of the first ground electrode (GND), the horizontal axis indicates a value of the width (WG1−W1) of a bottom surface portion excluding the protruding portion G1t.

Referring to FIG. 10, a tendency of decrease in the deviation amount starts around a point where the width (WG1−W1) of the bottom surface portion is 150 μm (WG1=168 μm), and in particular, in the case of 80 μm (WG1=98 μm) or less, the deviation amount is more effectively suppressed to a low level, and the effect of improving the frequency characteristics is expected. It is assumed that this is because it is preferable to set the width of the first ground electrode to be narrower to suppress the spread of the electric field lines and locally form the electric field.

Based on the above, it is preferable to set the width (width of the bottom surface portion of the first ground electrode) WG1 of the first ground electrode to 170 μm or less, and more preferably, to 100 μm or less, for example.

In the above, although the slit width (WSL) and the width (WG1) of the bottom surface portion of the first ground electrode have been examined separately, in general, the larger the slit width is with respect to the width of the first ground electrode, the more the electric field concentrates on the first ground electrode; the smaller the slit width is with respect to the width of the first ground electrode, the more the electric field is also distributed to the second ground electrode. Therefore, there is a correlation between the slit width (WSL) and the width (WG1) of the bottom surface portion of the first ground electrode, and with reference to the above simulation results, upon calculating the ratio between the two (WSL/WG1), it is understood that the effect of the slit starts to appear at the ratio of 0.4 or more, and the effect becomes more significant when the ratio becomes 0.8 or more.

In addition, in Patent Document 2 (Japanese Patent Application Laid-Open No. H5-196902), for speed matching, low switching voltage (low drive voltage), and impedance matching, it has been disclosed to set the width of the earth electrode (ground electrode) to be three times or less the width of the thermal electrode (signal electrode). However, in Patent Document 2, suppression of the dip phenomenon, which is a problem addressed by the optical waveguide element of the disclosure, or the second ground electrode and the slit between the first ground electrode and the second ground electrode necessary for the configuration of the disclosure were not mentioned at all.

Also, substrates such as LN are prone to cracks during cutting. In particular, in the case where a thin LN substrate is used, this phenomenon becomes significant. To prevent occurrence of cracks, the electrodes may be disposed over the entire surface of the substrate and to the edges of the substrate, as shown in FIG. 1. In the disclosure, by providing a slit in the ground electrode, the dip phenomenon is suppressed and occurrence of cracks is also prevented.

(Other Shapes of First Ground Electrode)

As shown in FIG. 7, the shape of the first ground electrode may have an L-shaped multi-step structure in which the lower portion is closer to the signal electrode than the upper portion, and the width W1 of the portion G1 t in which the lower portion protrudes toward the signal electrode side more than the upper portion in a direction perpendicular to the extending direction of the modulation effect portion may be set to a range of 20 to 70% of the width WS of the signal electrode.

Further, as shown in FIG. 7, the shape of the first ground electrode may have an L-shaped multi-step structure in which the lower portion is closer to the signal electrode than the upper portion, the height H1 of the lower portion may be 2 to 10 μm, and the total height of the lower portion and the upper portion may be 20 to 50 μm.

Figure 11:
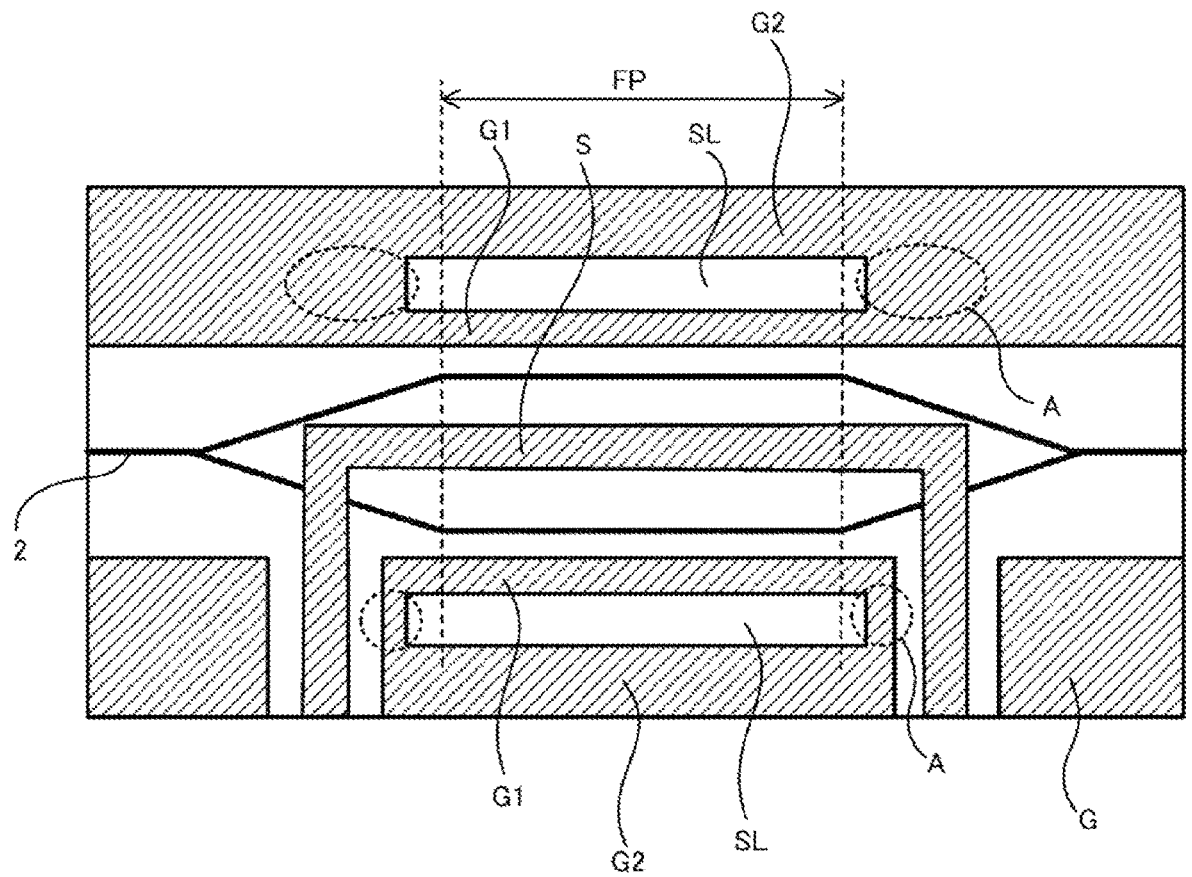
FIG. 11 is a view illustrating an arrangement relationship between a modulation effect portion and the slit in the optical waveguide element of the disclosure.

As shown in FIG. 11, in the case where the optical waveguide is a Mach-Zehnder optical waveguide, the portion where the signal electrode and two branch waveguides are parallel to each other is the "modulation effect portion (FP)". The slit of the ground electrode may be formed over the entire region of the modulation effect portion. By forming the slit of the ground electrode over the entire region of the modulation effect portion, it is possible to provide an optical waveguide element in which coupling with the substrate mode is suppressed and the dip phenomenon of the frequency characteristics is suppressed.

Figure 12:
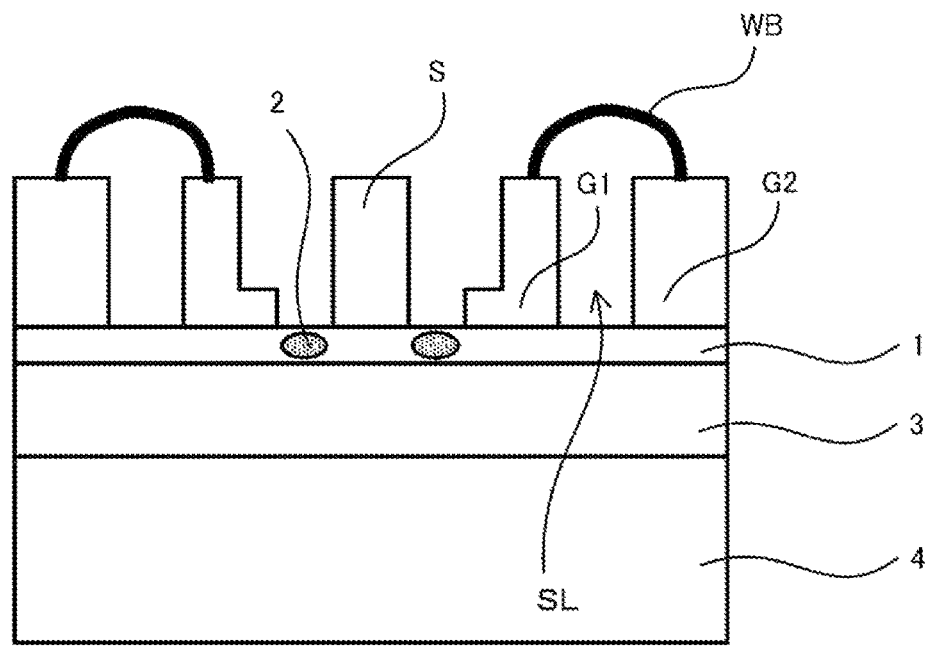
FIG. 12 is a view illustrating another electrical connection between a first ground electrode G1 and a second ground electrode G2 related to the optical waveguide element of the disclosure.

As described above, the ground electrode is separated into the first ground electrode and the second ground electrode by the slit, but the two may be electrically connected and kept at the same potential. Therefore, as shown in FIG. 11, it is also possible to provide an electrical connection portion (dotted line frame A in FIG. 11) between the first ground electrode and the second ground electrode outside a range FP corresponding to the modulation effect portion of the optical waveguide. Moreover, as shown in FIG. 12, it is also possible to electrically connect the first ground electrode G1 and the second ground electrode G2 by wire bonding (WB). In addition to wire bonding, various configurations may also be used to electrically connect the first ground electrode G1 and the second ground electrode G2 at least partially to each other.

Figure 13:
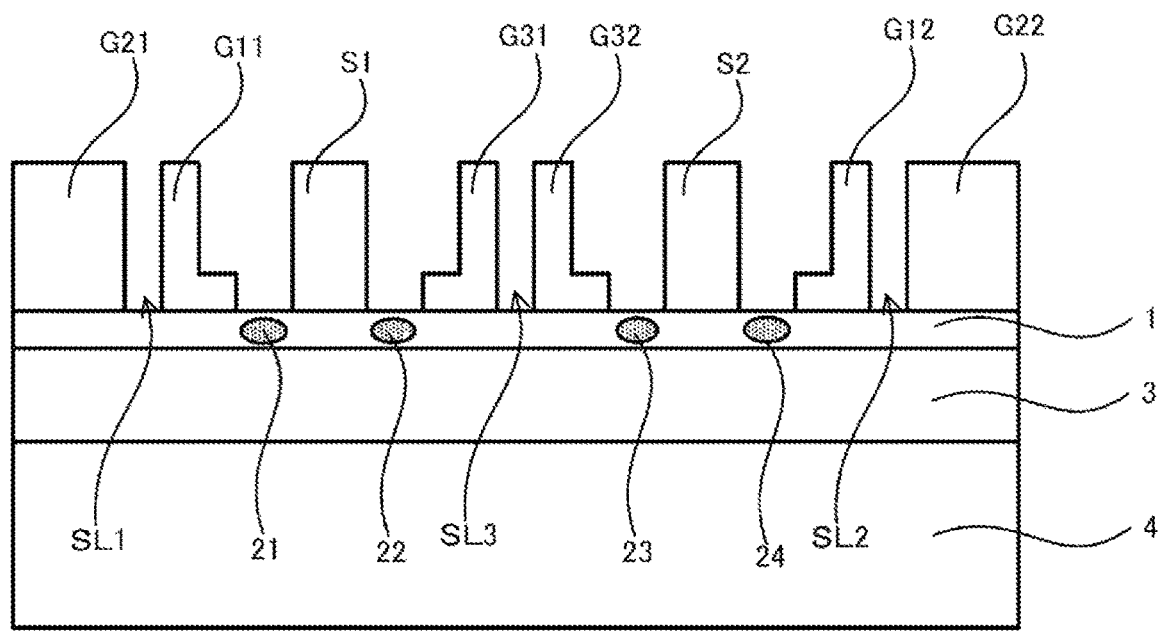
FIG. 13 is a view illustrating an application example in which a plurality of Mach-Zehnder optical waveguides are provided in the optical waveguide element of the disclosure.

In cases of arranging a plurality of optical waveguides side by side in a substrate, or arranging a plurality of Mach-Zehnder optical waveguides side by side, as shown in FIG. 13, ground electrodes (G31, G32) may be arranged between optical waveguides (between 22 and 23). In such cases, when viewed from a signal electrode S1, the ground electrode G31 serves as the first ground electrode, and the ground electrode G32 serves as the second ground electrode. A slit SL3 is provided. On the other hand, when viewed from a signal electrode S2, the ground electrode G32 serves as the first ground electrode, and the ground electrode G31 serves as the second ground electrode. Therefore, the width of the slit SL may be 40 μm or more, and the width of each ground electrode (G31, G32) may be 100 μm or less. Regarding other signs in FIG. 13, G11 and G12 indicate first ground electrodes, and G21 and G22 indicate second ground electrodes. SL1 and SL2 indicate slits. The optical waveguides are 21 to 24. For example, 21 and 22 indicate branch waveguides of one Mach-Zehnder optical waveguide, and 23 and 24 indicate branch waveguides of another Mach-Zehnder optical waveguide.

Figure 14:
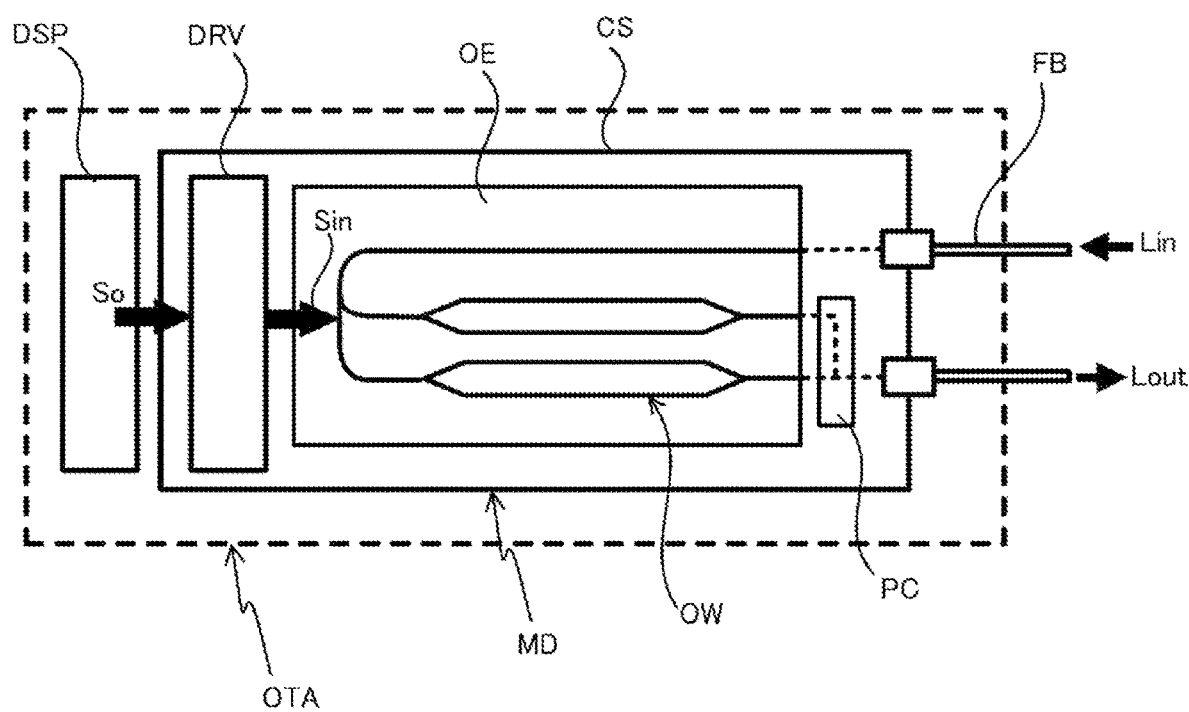
FIG. 14 is a plan view illustrating an optical modulation device and an optical transmission device according to the disclosure.

As shown in FIG. 14, an optical waveguide element OE of the disclosure provides a modulation electrode (control electrode, not shown) which modulates a light wave propagating through an optical waveguide OW in a substrate and is accommodated in a housing CS. Furthermore, an optical modulation device MD can be configured by providing an optical fiber FB which inputs and outputs light waves (input light Lin and output light Lout) from and to the optical waveguide OW. The optical fiber may not only be arranged outside the housing CS as shown in FIG. 14, but may also be introduced and fixed into the housing via a through-hole penetrating a sidewall of the housing. A sign PC indicates a polarization combining means.

An optical transmission device OTA may be configured by connecting, to the optical modulation device MD, an electronic circuit (digital signal processor DSP) which outputs a modulation signal So causing the optical modulation device MD to perform a modulating operation. A driver circuit DRV is used since a modulation signal Sin applied to the optical waveguide element needs to be amplified. The driver circuit DRV and the digital signal processor DSP may be arranged outside the housing CS, but may also be arranged inside the housing CS. In particular, by arranging the driver circuit DRV inside the housing, it is possible to further reduce the propagation loss of the modulation signal from the driver circuit.

As described above, according to the disclosure, it is possible to provide an optical waveguide element which suppresses the dip phenomenon of frequency characteristics and suppresses an increase in manufacturing cost. Also, it is possible to provide an optical modulation device and an optical transmission device using the optical waveguide element.

What is claimed is:

1. An optical waveguide element comprising:
    a substrate having an electro-optic effect;
    an optical waveguide formed in the substrate; and
    a control electrode arranged on the substrate to modulate a light wave propagating through the optical waveguide,
    wherein the control electrode comprises a signal electrode and a ground electrode,
    the signal electrode and the ground electrode are arranged along a modulation effect portion of the optical waveguide that performs modulation,
    a shape of a bottom surface of the ground electrode facing the substrate, a slit separating the ground electrode into a first ground electrode close to the signal electrode and a second ground electrode far from the signal electrode is formed in a range corresponding to the modulation effect portion, and
    a width of the slit in a direction perpendicular to an extending direction of the modulation effect portion is 40 μm or more,
    a shape of the first ground electrode has an L-shaped multi-step structure in which a lower portion is closer to the signal electrode than an upper portion, and
    a width of the lower portion protruding toward a signal electrode side more than the upper portion in a direction perpendicular to an extending direction of the modulation effect portion is set to a range of 20 to 70% of a width of the signal electrode.

2. The optical waveguide element according to claim 1, wherein a width of a bottom surface portion of the first ground electrode in a direction perpendicular to an extending direction of the modulation effect portion is 100 μm or less.

3. The optical waveguide element according to claim 1, wherein a ratio (WSL/WG1) of a width (WSL) of the slit in a direction perpendicular to an extending direction of the modulation effect portion to a width (WG1) of a bottom surface portion of the first ground electrode in the direction perpendicular to the extending direction of the modulation effect portion is 0.4 or more.

4. The optical waveguide element according to claim 1, wherein a shape of the first ground electrode has an L-shaped multi-step structure in which a lower portion is closer to the signal electrode than an upper portion,
    a height of the lower portion is 2 to 10 μm, and
    a total height of the lower portion and the upper portion is 20 to 50 μm.

5. The optical waveguide element according to claim 1, wherein the first ground electrode and the second ground electrode are electrically connected to each other outside the range corresponding to the modulation effect portion of the optical waveguide.

6. The optical waveguide element according to claim 1, wherein the substrate has a thickness of 20 μm or less, and
    a holding substrate is arranged on a back side of the substrate via an adhesive layer.

7. An optical modulation device, wherein the optical waveguide element according to claim 1 is accommodated in a housing, and the optical modulation device comprises an optical fiber which inputs or outputs a light wave from or to the optical waveguide.

8. The optical modulation device according to claim 7, comprising an electronic circuit inside the housing to amplify a modulation signal inputted to the signal electrode of the optical waveguide element.

9. An optical transmission device comprising:
    the optical modulation device according to claim 7; and
    an electronic circuit which outputs a modulation signal causing the optical modulation device to perform a modulation operation.

* * * * *